Figure 1:
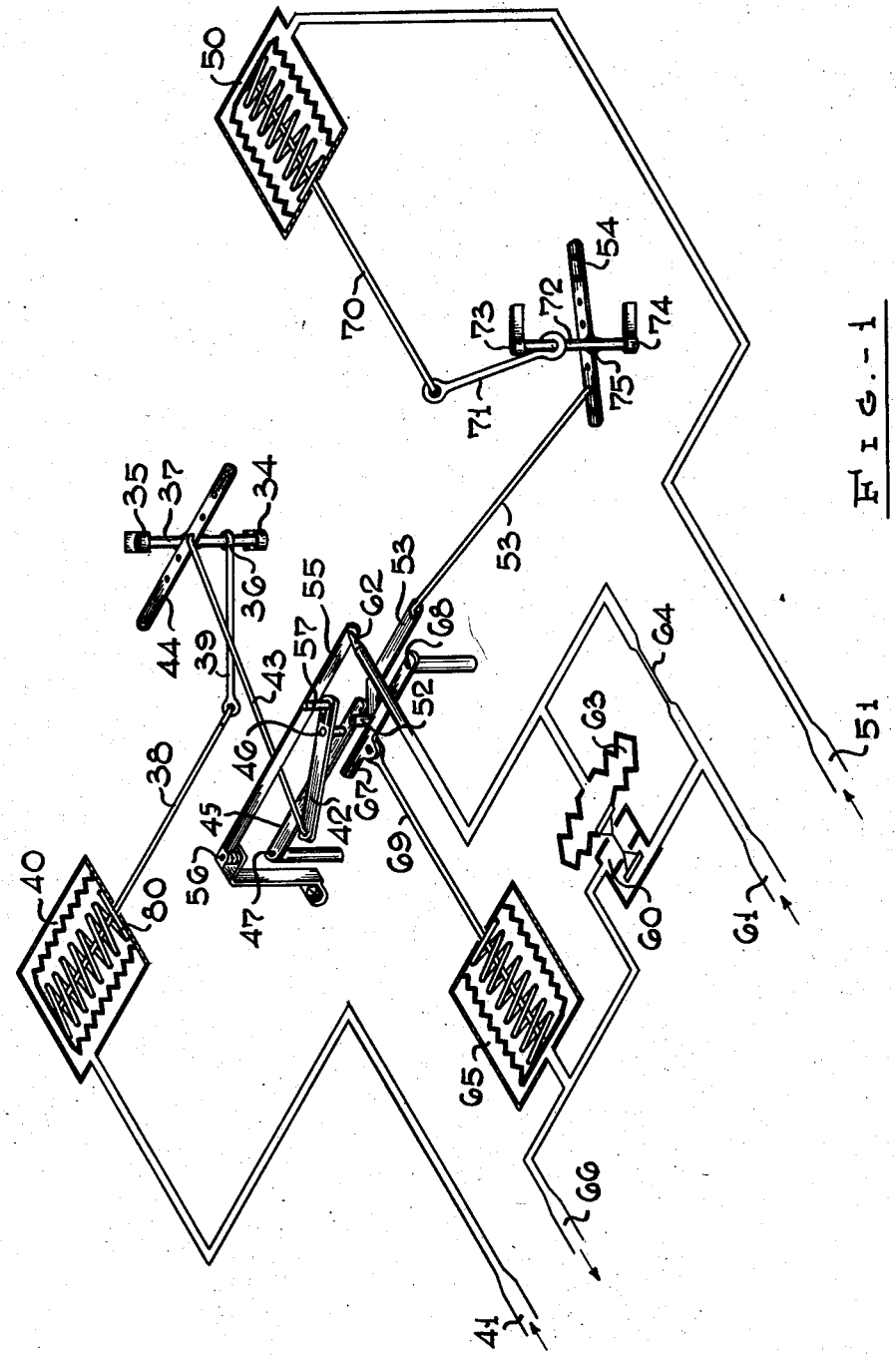

Patented Mar. 24, 1953

2,632,456

UNITED STATES PATENT OFFICE 2,632,456

VARIABLE RATIO CONTROLLER

Harry B. Breedlove, Baton Rouge, La.

Application February 21, 1948, Serial No. 10,028

4 Claims. (Cl. 137—85)

The present invention is concerned with an improved apparatus to automatically adjust a ratio control device. The invention is more particularly concerned with automatically controlling the ratio of chemical, or physical properties of 2 streams of materials, determined at primary control points in the streams, responsive to variations in the properties of an integral or associated system, dependent on variations of the properties of the streams determined at a second sensing point. The properties referred to may be quantity of flow, temperature, chemical composition, pressure, mass, viscosity, etc. For example, the invention is concerned with an instrument for controlling the ratio of fluids blended for feed to chemical processing-plates responsive to the chemical composition of the fluids, the ratio of fuel fed to a furnace and fluids heated by the furnace responsive to the heating requirements, the ratio of fuel to air for combustion control responsive to the composition of the flue gases, the ratio of fluids extracted from chemical process or fractionating plants reponsive to product quality, or to the ratio of acids to bases added to a system responsive to pH.

There are many types of ratio control devices known to the prior art. These devices are suitable for maintaining a particular ratio of the chemical and physical properties of 2 streams of materials. Thus devices are employed to maintain the flow rate of one stream at a given ratio of the flow rate of another stream, to maintain the mass of one stream of material at a given ratio to the mass of another stream, to maintain the viscosity of one stream at a given ratio to the viscosity of another stream, etc. Broadly it may be said that these devices are suitable for maintaining a fixed ratio between 2 or more process variables. However, these devices, known to the art, are not suitable for automatically changing the ratio of the process variables responsive to changes which occur necessitating a change in ratio.

It is, therefore, the primary object of this invention to provide control means to automatically vary the ratio of ratio control devices as such variation is required by the control system.

In accordance with the present invention, sensing devices are placed in the system to be controlled operative to operate a control mechanism varying the ratio of controlled process variables as required. As indicated above, the sensing devices may be responsive to any chemical or physical property. It is, of course, essential that the sensing device be capable of converting the measurement of the property determined to a form of energy suitable for use in a control device. This conversion may be of different types, although is commonly a conversion to variations in gas pressure suitable for controlling valves and the like. For example, it is common in many types of temperature and pressure measuring instruments to cause variations in air pressure on a line which controls the position of a valve placed at a control point of the system. The apparatus of this invention is adaptable for use with such sensing devices, that is, in sensing devices capable of determining chemical or physical properties and causing variations of gas pressure in a control line responsive to such variations. As these sensing devices are no part of the present invention they will not be described, or referred to in detail. It is to be understood, however, that the apparatus of this invention is adaptable for use in any system utilizing the sensing devices of the general type indicated.

As stated, sensing devices of the type described, are placed in a particular system where it is desired to maintain a particular ratio of process variables. Responsive to variations of the properties of the system, the sensing devices will develop variations in the fluid pressure in auxiliary control lines which are conducted to an apparatus to be hereinafter described. This apparatus comprises mechanical linkage principles whereby variations of fluid pressure in the auxiliary control lines will cause movement of the mechanical linkages operative to vary the ratio of the properties being controlled. This invention may be more fully understood by reference to the following drawings.

Figure 2:
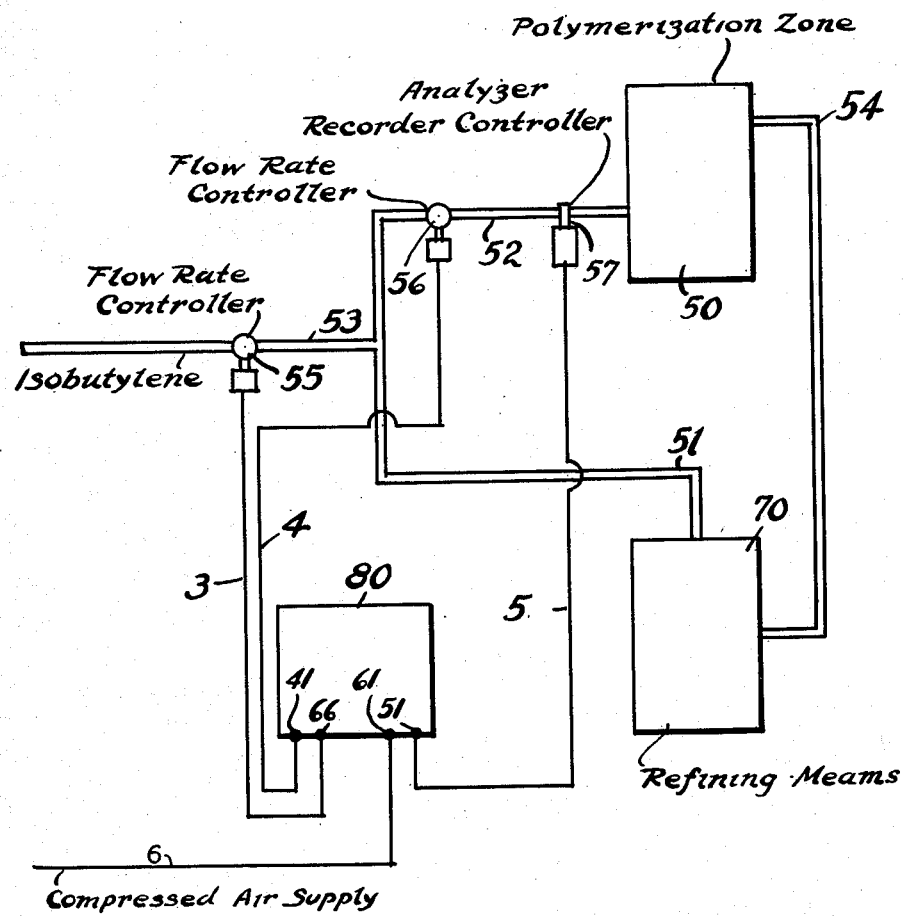
Figure 3:
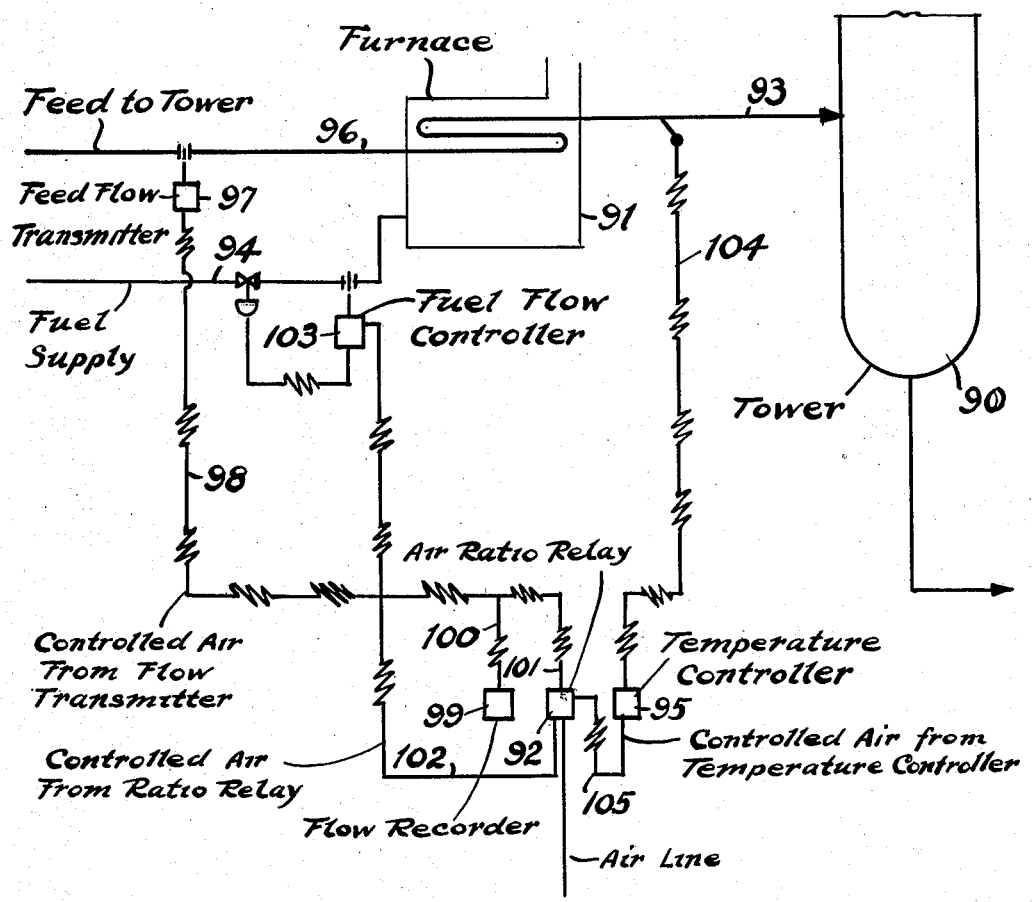

Figure 1 diagrammatically illustrates in perspective the ratio control device of this invention and;

Figure 2 diagrammatically illustrates an application of the control device of this invention to a chemical polymerization process and;

Figure 3 similarly shows an application for the purpose of controlling a heating furnace.

Referring to Figure 1, air or fluid pressure is applied to connection 41 by a first sensing element, such as a flow, pressure, level, or temperature indicator. Similarly, air or fluid pressure is applied to connection 51 by a second sensing element. These air or fluid pressures applied to connections 41 and 51 control the air or fluid pressure applied to 66 from a constant air pressure source through line 61 and valve 60. Line 66 is connected to a valve or a similar control device. The ratio of the air pressure of 41 to the air pressure of 66 is constant as long as the air pressure in 51 is not changed. If the air pressure of 51 changes, the ratio between the air pressures of 41 and 66 will change.

If the air pressure is decreased in 41, the bellows 40 will expand causing the spring 80 to expand, moving connecting link 38 inward toward the bellows. Since connecting link 38 is pinned to 39, this movement of connecting link 38 will cause lever 39 to move in a clockwise direction. Lever 39 is rigidly attached to shaft 37 which shaft rotates on bearings 34 and 35. When lever 39 moves in a clockwise direction, shaft 37 will rotate clockwise. Lever 44 is rigidly attached to shaft 37. Thus, when shaft 37 rotates clockwise, lever 44 will also move in a clockwise direction. This movement of lever 44 will cause connecting link 43 to move to the left. Since lever 43 is pinned to lever 42, which is pivoted at 46, this movement of connecting link 43 will move lever 42 counterclockwise.

When lever 42 rotates counterclockwise, roller 57 will exert pressure against spring tensioned flapper 55 causing the flapper 55 to release pressure on nozzle 62

Releasing the pressure on nozzle 62 will cause bellows 63 to contract, closing slightly pilot valve 62. The amount of air flowing from 61 will be decreased and less pressure will be exerted on bellows 65, which is a follow-up or throttling bellows. Thus, bellows 65 will expand and connecting link 69 will move to the left.

When 69 moves to the left, lever 67, which is pinned at and rotates about 68, rotates counterclockwise causing roller 52 to move to the left. Thus, the movement of roller 52 will make lever 45 rotate clockwise about pin 47. By means of pin 46, lever 42 will also move clockwise causing pin 57 to move flapper 55 closer to nozzle 62. This tends to throttle the air pressure.

By means of the above movements the relation between air pressure on 41 and 66 may be maintained. As we mentioned before, the ratio of air pressure of 41 to 66 will be constant as long as the pressure in 51 does not change.

If the pressure in 51 changes, let us assume that it decreases, bellows 50 will expand causing connecting linkage 70 to move to the right. This will make lever 71 rotate clockwise about shaft 72. Lever 71 is rigidly attached to shaft 72, which rotates on bearings 73 and 74. Since lever 54 is also rigidly attached to shaft 72 at point 75, when shaft 72 rotates clockwise, lever 54 will move in the same direction. This will cause connecting link 53 to move slightly backward. In order to obtain greater flexibility of the device connecting link 53 may be connected to lever 54 at various points shown on lever 54. Movement of connecting link 53 will cause roller 52 to move backward changing the position of lever 45 which rotates about pivot 47. This counterclockwise movement of lever 45 will move flapper 55 away from nozzle 62. This decrease in pressure in nozzle 62 will cause bellows 63 to contract, opening slightly valve 60 to decrease the air pressure in 66. Thus the change in pressure in 51 will cause a change in the ratio of the air pressure in 41 and 66. It is to be understood that the bellows may be replaced by a diaphragm or piston.

Among the practicable uses of my device, outlined previously, is the application of the variable ratio controller device to the manufacture of valuable copolymers of isobutylene with multiolefins such as butadiene. In accordance with the present invention, the composition of the hydrocarbon mixture passed to the polymerization zone is controlled by a dual control instrument actuated at two points by the composition of the material being passed to the polymerization zone and by the quantity of the material being passed to the polymerization zone.

It is known in the art to produce extremely valuable copolymers of isobutylene with a multiolefin, such as butadiene, isoprene and the like, by a low temperature reaction in the presence of a diluent, such as methyl chloride, using a dissolved Friedel-Crafts catalyst to carry out the desired reaction. The reaction is preferably conducted commercially as a continuous process, in which steady streams of feed mixture and catalyst solution are delivered to a refrigerant jacketed reactor and an overflow of polymer slurry in unreacted material is discharged into warm water from which the solid polymer is separated, dried and prepared for commercial use while the volatilized materials are recovered, purified and recycled.

In this polymerization operation the feed stock comprises commercially pure isobutylene, recycle methyl chloride with a low isobutylene content and a small amount of isoprene. Since the concentration of isobutylene in this low hydrocarbon content recycle feed will vary from about 3% to 10% and the amount of methyl chloride will vary from about 90 to 97%, it is desirable to have some automatic means of controlling the quantity of fresh isobutylene that must be added to this recycle feed in order to increase the hydrocarbon concentration so that the desired product will be obtained. In general it is essential that the percentage of hydrocarbon in this feed blend should be held within close tolerances in order to obtain good product quality.

My invention will be readily understood by reference to the drawings illustrating embodiments of the same. Figure 2 is a diagrammatic sketch of the polymerization process.

Referring specifically to Figure 2, recycle methyl chloride containing from about 3 to 10% isobutylene is introduced into polymerization zone 50 by means of lines 51 and 52. Isobutylene containing a small percentage of isoprene is mixed with the recycle methyl chloride and introduced by means of line 53. The product is withdrawn from polymerization zone 50 by means of line 54 and passed to refining and purification means 70. No attempt will be made to describe the operation of means 70 in detail since this phase of the operation is known and does not constitute a part of my invention. Suffice it to say that methyl chloride is separated as a separate stream from means 70 by line 51 and recycled to zone 50 as hereinbefore described. Polymerization zone 50 is operated at a temperature in the range from about $-135°$ F. to $-130°$ F. The pressure is in the range from about 5 to 20 pounds while the catalyst comprises from .3 to .4% aluminum chloride dissolved in methyl chloride. The amount of isoprene present is generally about 3% based upon the isobutylene.

In order to secure a satisfactory operation and consistant product quality, it is essential that the amount of isobutylene in the feed mixture to the polymerization zone be held within close tolerances, approximately ±0.3%, in the range from about 18 to 28%. Since the amount of isobutylene in the recycle stream 51 ranges from about 3 to 10%, the quantity of isobutylene introduced by means of line 53 must of necessity be adjusted currently. Furthermore, the amount of isobutylene introduced by means of line 53 will vary depending upon the total quantity of materials being recycled, as well as, upon the isobutylene content of these materials being recycled.

Heretofore, many attempts have been made to control automatically the quantity of isobutylene being introduced so as to get the correct concentration in the feed material. None of the preferred suggestions were particularly successful and no attempt will be made to discuss them in detail. I have, however, now discovered that providing a particular method be employed, I can accurately control the concentration of the isobutylene being passed to the polymerization zone.

In accordance with my invention I actuate a fluid flow control device, such as that manufactured by The Brown Instrument Company, Philadelphia, Pa., and listed in their Catalog No. 9400, on line 53 by the air ratio relay 80. As the name suggests the identified fluid flow control device adjusts the quantity of fluid flow through line 53 responsive to changes in air pressure supplied to the control device. This air ratio relay 80, described in connection with Figure 1, is in turn actuated by a fluid flow control device 56, such as that manufactured by The Brown Instrument Company, and listed in their catalog Number 8904, and an analyzer recorder control device 57, such as that manufactured by The Leeds and Northrup Company, Philadelphia, Pa., and listed in their catalog Number N-91-163, both of which are positioned on feed line 52. In essence the fluid flow control device 56 is operative to maintain the air pressure of a control line at a level proportional to fluid flow through the device, and similarly the analyzer control device 57 is operative to maintain the air pressure of a control line proportional to the concentration of a constituent, or constituents in the fluid flowing through the device; in this example the concentration of isobutylene analyzer recorder control device 57 is connected to air ratio relay 80 so as to establish a ratio between liquid flow control device 55 and liquid flow control device 56.

The controlled air pressure produced by analyzer recorder controller 57 is fed to ratio relay 80 through line 5 which is connected to ratio relay 80 at point 51. The points 41, 66, 61, and 51 on ratio relay 80 correspond to like numbered connection points as shown in Figure 1. Controlled air pressure from flow rate controller 56 is connected to point 41 on ratio relay 80 through line 4. Controlled air from point 66 on ratio relay 80 is connected to index setting mechanism (not shown) on flow rate controller 55 by means of line 3. Line 6 connects compressed air supply (not shown) to point 61 on ratio relay 80. The operation of the air ratio relay 80 has been described in detail hereinbefore and is shown in Figure 1.

This device may also be used in a process where temperature control is desirable. Referring to Figure 3, it is necessary that the temperature of the feed to the tower 90 be kept constant. Since the feed rate to the furnace 91 and tower 90 may vary, the rate of firing to the furnace 91 must be varied accordingly. The air ratio relay 92 will maintain a constant ratio between the rate of feed through line 93 to the tower 90 and the fuel fed through line 94 to the furnace 91 as long as temperature of the feed to the tower 90 remains constant. Thus, if the feed rate to the tower 90 changes, the air ratio relay 92 will automatically change the firing rate to the furnace 91. Only if the temperature of the feed to the tower 90 varies, say, because of a change in the temperature of the feed (before it passes through the furnace 91) or because of variation in the B. t. u. content of the fuel, the ratio of the feed rate to fuel rate will be changed by the air ratio relay 92.

A more detailed description of this application is as follows:

Referring again to Figure 3, if the rate of feed fed to furnace 91 through line 96 varies, let us assume that the rate increases, the firing rate to the furnace 91 must be increased in order to maintain the constant temperature of the feed passing through line 93 to tower 90. This increase in feed rate is noted by the feed flow transmitter 97 such as that manufactured by the Brown Instrument Company and described in their Catalog Number 8904, which feed flow transmitter 97 in turn causes an increase in the air pressure in line 98. This increase of air pressure in lines 98 and 100 will cause the change in flow to be recorded in flow recorder 99, such as that manufactured by the Brown Instrument Company and described in their Catalog Number 8904. The change in air pressure in line 98 will also effect the air pressure in air ratio relay 92 through line 101. This increase in the air pressure in line 101 by means of the air ratio relay 92 will cause an increase in the air pressure in line 102 which is connected to fuel flow controller 103, such as that manufactured by Brown Instrument Company and described in their Catalog Number 9400. This change in air pressure in line 102 will cause the feed flow controller 103 to increase the rate of the fuel fed through line 94 to the furnace 91. Thus the constant temperature of the feed in line 93 to tower 90 is maintained by increasing the rate of fuel fed through line 94 to furnace 91 when the feed rate through line 96 to the furnace 91 is increased. Inversely, with a decrease in feed rate in line 96 to furnace 91, the fuel rate to furnace 91 is correspondingly decreased in order to maintain a constant temperature of feed line 93 to tower 90.

If the temperature of the feed in line 96 to furnace 91 should increase, for example, then the rate of fuel fed to furnace 91 through line 94 must be decreased in order to maintain a constant temperature of the feed in line 93 to tower 90. The increase in temperature of the feed in line 96 will first be noted through line 104 by the temperature controller 95, such as that manufactured by Brown Instrument Company and described in their Catalog Number 15-4. This increases in temperature of feed, as sensed by temperature controller 95, will cause a decrease in the air pressure in line 105. This decrease in air pressure in line 105 by means of air ratio relay 92 will cause a decrease in the air pressure of line 102 which is connected to fuel flow recorder 103. This change in air pressure in line 102 will cause the fuel flow recorder 103 to decrease the rate of fuel fed through line 94 to furnace 91. Thus the constant temperature of the feed in line 93 to tower 90 is maintained by decreasing the rate of fuel fed through line 94 to furnace 91 when the temperature of the feed in line 96 to furnace 91 is increased. Inversely if the temperature of the feed in line 96 decreases, the fuel rate to furnace 91 is increased in order to maintain a constant temperature of the feed in line 93 to tower 90.

Additional applications of this device will be apparent to one skilled in the art.

The process of my invention is not to be limited by any theory as to mode of operation but only in and by the following claims in which it is desired to claim all novelty insofar as the prior art permits.

I claim:

1. Apparatus for controlling the relation of fluid pressures in three fluid control conduits comprising a first pressure responsive means positioned in a first fluid control conduit operative to move a first bar responsive to fluid pressure variations in the first control conduit, a flapper valve connected to a fluid supply line, a first system of mechanical linkages connected to said first bar and the flapper of the said flapper valve operative to vary the position of the flapper relative to the valve on movement of the said first bar whereby the pressure in the said fluid supply line is varied, a second pressure responsive means positioned in a second fluid control conduit operative to move a second bar responsive to fluid pressure variations in the said second control conduit, a second system of mechanical linkages connected to said second bar and the said flapper operative to vary the position of the said flapper relative to the valve, a pressure responsive throttling valve associated with said second fluid control conduit and with said fluid supply line adapted to control the pressure of the fluid in the said second conduit responsive to fluid pressure variations in the said fluid supply line, a third pressure responsive means positioned in a third fluid control conduit operative to move a third bar responsive to fluid pressure variations in the third control conduit, and a third system of mechanical linkages connected to said third bar and the said flapper operative to vary the position of the flapper relative to the valve on movement of the said third bar.

2. Apparatus for controlling the relation of fluid pressures in three fluid control conduits comprising a first pressure responsive means positioned in a first fluid control conduit operative to move a first bar responsive to fluid pressure variations in the said first fluid control conduit, a flapper valve connected to a fluid supply line, a system of mechanical linkages connected to said first bar and the flapper of the said flapper valve operative to vary the position of the flapper relative to the valve whereby the pressure in the said fluid supply line is varied, a second pressure responsive means positioned in a second fluid control conduit adapted to control the pressure of the fluid in the said second conduit responsive to fluid pressure variations in the said fluid supply line, a third pressure responsive means positioned in the said second conduit operative to move a second bar responsive to fluid pressure variations in the second conduit, said second bar being operatively connected to the said system of mechanical linkages so as to effect the position of the flapper relative to its associated valve, a fourth pressure responsive means positioned in a third fluid control conduit operative to move a third bar responsive to fluid pressure variations in the third control conduit, said third bar being operatively connected to the said system of mechanical linkages to vary the position of the said flapper relative to its associated valve.

3. Control apparatus for adjusting the relation of fluid pressures in three fluid conduits comprising in combination pressure responsive means positioned in each of the said conduits adapted to move three individual bars responsive to pressure variations in each of said conduits, a fluid supply source and a flapper valve connected to said source, a system of mechanical linkages operated by each of the said bars effective to vary the position of the said flapper relative to the flapper valve, and a means responsive to the position of the said flapper operative to control the pressure on one of the said three conduits.

4. Apparatus for varying the ratio of fluid pressures in a first and second fluid system responsive to the variation of fluid pressure in a third fluid system comprising in combination a pressure responsive means positioned in the said first fluid system operative to move a bar responsive to fluid pressure variations, mechanical linkages connected to the said first bar operative to move a lever having a contact point around a pivot point of the lever, a second pivoted bar adjacent the said pivoted lever and in contact with the said contact point of the lever adapted to be moved by the pivoting of the lever, a second pressure responsive means positioned in a second fluid system operative to move a third bar responsive to fluid pressure variations, mechanical linkages connected to said third bar adapted to move the pivot point of the said lever on movement of the said third bar, a third pressure responsive means positioned in the said third conduit operative to move a fourth bar responsive to fluid pressure variations, mechanical linkages connected to said fourth bar adapted to effect the position of the said pivot point of the pivoted lever and means responsive to variations in position of the said second bar operative to control the pressure in the said second fluid system.

HARRY B. BREEDLOVE.

REFERENCES CITED

The following references are of record in the file of this patent:

UNITED STATES PATENTS

| Number | Name | Date |
|---|---|---|
| 2,042,374 | Wunsch | May 26, 1936 |
| 2,117,800 | Harrison et al. | May 17, 1938 |
| 2,124,946 | Harrison et al. | July 26, 1938 |
| 2,125,081 | Moore | July 26, 1938 |
| 2,125,109 | Harrison et al. | July 26, 1938 |
| 2,193,095 | Harrison | Mar. 12, 1940 |
| 2,246,934 | Denney | June 24, 1941 |
| 2,272,256 | Vogt | Feb. 10, 1942 |
| 2,302,326 | Kehoe | Nov. 17, 1942 |
| 2,381,948 | Gess | Aug. 14, 1945 |
| 2,388,669 | Baker | Nov. 13, 1945 |
| 2,410,335 | Burdick | Oct. 29, 1946 |

OTHER REFERENCES

"Relay Devices and Their Application to the Solution of Mathematical Equations," by H. Ziebolz (copyright 1940 by Askania Regulator Co.), page 10 of vol. 1 (text) and page 6 of vol. 2 (diagrams).